US012738244B1

(12) United States Patent
Gao et al.

(10) Patent No.: US 12,738,244 B1
(45) Date of Patent: Sep. 15, 2026

(54) CHOLESTERIC LIQUID CRYSTAL DISPLAY AND DRIVING METHOD THEREOF

(71) Applicant: AUO Corporation, Hsinchu City (TW)

(72) Inventors: Yu Lun Gao, Hsinchu City (TW); Shao-Wen Yen, Hsinchu City (TW); Yu-Huei Jiang, Hsinchu City (TW); Jen-Chieh Hsieh, Hsinchu City (TW); Kuo-Yu Hsiung, Hsinchu City (TW); Wei-Kai Huang, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/309,595

(22) Filed: Aug. 25, 2025

(30) Foreign Application Priority Data

May 21, 2025 (TW) ................................ 114119077

(51) Int. Cl.
*G09G 3/36* (2006.01)

(52) U.S. Cl.
CPC ....... *G09G 3/3648* (2013.01); *G09G 2310/08* (2013.01); *G09G 2320/0209* (2013.01)

(58) Field of Classification Search
USPC ........................................................ 345/58
See application file for complete search history.

(56) References Cited

U.S. PATENT DOCUMENTS

| | | | | |
|---|---|---|---|---|
| 2005/0068279 A1* | 3/2005 | Hirota | H10D 86/00 257/E27.111 |
| 2011/0242084 A1* | 10/2011 | Nakayama | G09G 3/3614 345/212 |
| 2018/0240421 A1* | 8/2018 | Yamazaki | G09G 3/3614 |

FOREIGN PATENT DOCUMENTS

| | | |
|---|---|---|
| TW | 201306013 | 2/2013 |
| TW | I812139 | 8/2023 |
| TW | 202340817 A * | 10/2023 |

* cited by examiner

*Primary Examiner* — Nathan P Brittingham
(74) *Attorney, Agent, or Firm* — JCIPRNET

(57) ABSTRACT

A cholesteric liquid crystal (CLC) display and a driving method thereof capable of reducing H cross-talk are provided. The CLC display includes a CLC panel and a controller. The CLC panel includes a plurality of pixel units. During a frame update period, the controller applies a plurality of data voltages arranged in a first polarity combination to the pixel units in a first scan period. The first polarity combination includes different polarities. The controller further applies a common mode voltage having a DC voltage value to the pixel units in the first scan period.

12 Claims, 6 Drawing Sheets

V type

H type

Dot type

CHOLESTERIC LIQUID CRYSTAL DISPLAY AND DRIVING METHOD THEREOF

CROSS-REFERENCE TO RELATED APPLICATION

This application claims the priority benefit of Taiwan application serial no. 114119077, filed on May 21, 2025. The entirety of the above-mentioned patent application is hereby incorporated by reference herein and made a part of this specification.

BACKGROUND

Technical Field

The disclosure relates to a bistable display, and particularly relates to a cholesteric liquid crystal display and a driving method thereof.

Description of Related Art

A bistable display may use bistable media to may perform display. For example, an electronic paper display may use electrophoretic particles. A cholesteric liquid crystal (CLC) display may use cholesteric liquid crystals.

Generally, a CLC display may drive the arrangement state of cholesteric liquid crystal to be planar state arrangement or focal-conic state arrangement. In the process of switching the arrangement state, the CLC display needs to apply a driving voltage and a common mode voltage to the CLC pixel to form a large voltage difference (for example, 40 volts), thereby updating the arrangement state of the cholesteric liquid crystal.

Specifically, the CLC display may apply a driving voltage having a first polarity (for example, positive voltage) and a corresponding common mode voltage to the two ends of the CLC pixel. The CLC display also applies a driving voltage having another polarity (for example, negative voltage) and a corresponding common mode voltage to the two ends of the CLC pixel. However, based on the large voltage difference at the two ends of the CLC pixel, one end of the CLC pixel (for example, the end receiving the common mode voltage) may be affected by charge coupling, causing the CLC display to have horizontal cross-talk (H cross-talk).

SUMMARY

An embodiment of the disclosure provides a CLC display capable of reducing H cross-talk.

A CLC display of an embodiment of the disclosure includes a CLC panel and a controller. The CLC panel includes a plurality of pixel units. The controller is coupled to the plurality of pixel units. During a frame update period, the controller is configured to apply a plurality of data voltages arranged in a first polarity combination to the pixel units in a first scan period. The first polarity combination has different polarities. The controller is also configured to apply a common mode voltage having a DC voltage value to the pixel units in the first scan period.

An embodiment of the disclosure further provides a driving method of a CLC display. The driving method includes the following steps. During a first scan period of a frame update period, a plurality of data voltages arranged in a first polarity combination are applied to a plurality of pixel units through a controller. The first polarity combination has different polarities. During the first scan period, a common mode voltage having a DC voltage value is applied to the pixel units through the controller.

Based on the above, the CLC display and the driving method thereof of an embodiment of the disclosure apply a plurality of data voltages having different polarities to a plurality of pixel units in a single scan period. Along with a DC common mode voltage, this ensures that the influence of voltage drop on the end of these pixel units receiving the common mode voltage may be reduced. Thus, the CLC display may reduce the influence of charge coupling on the plurality of pixel units, thereby reducing H cross-talk.

In order to make the above-mentioned features and advantages of the disclosure clearer and easier to understand, the following embodiments are given and described in details with accompanying drawings as follows.

DESCRIPTION OF THE EMBODIMENTS

Figure 1:
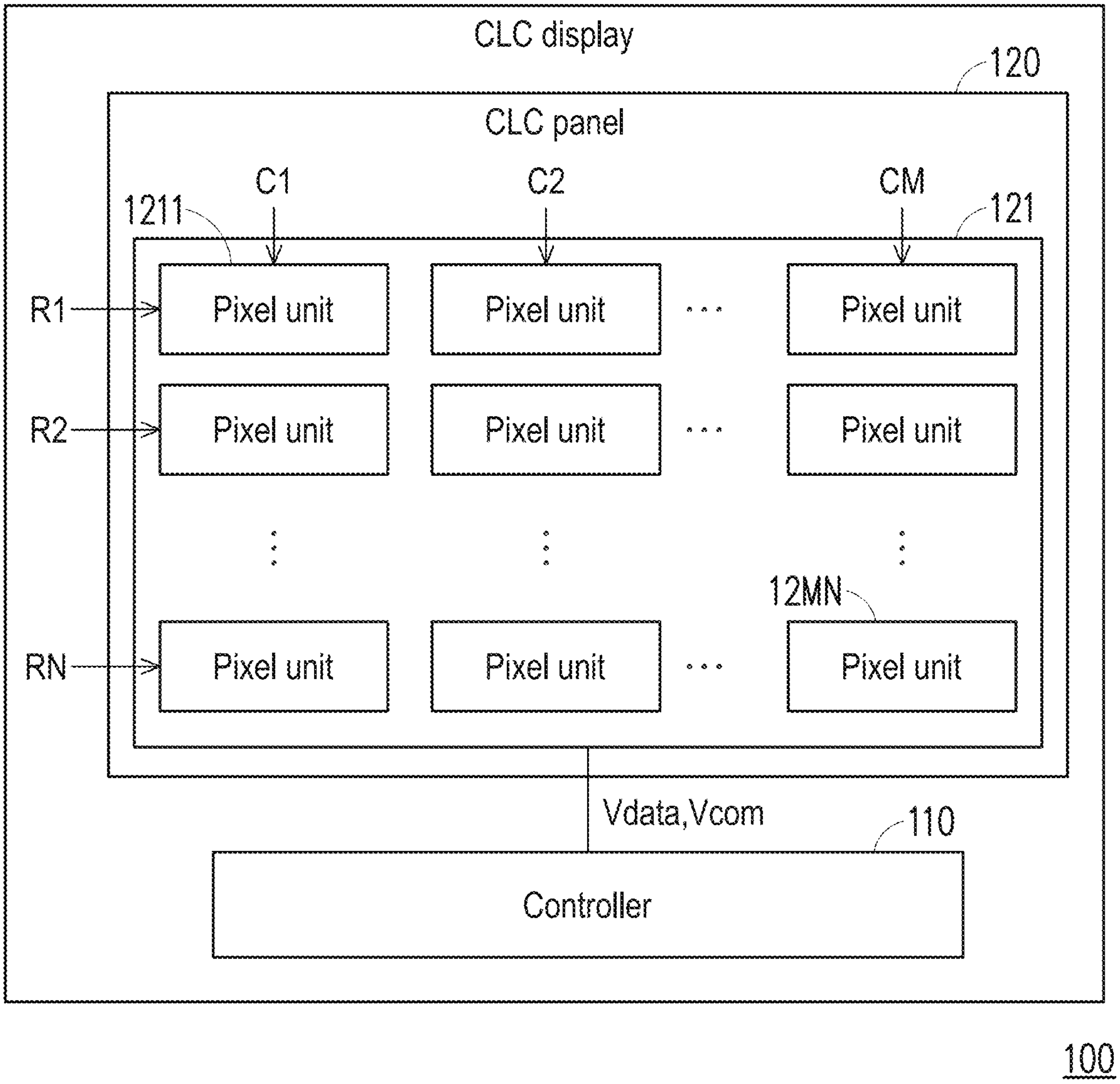
FIG. 1 is a circuit block diagram of a CLC display according to an embodiment of the disclosure.

Some embodiments of the disclosure accompanied with the drawings will now be described in detail. For reference numerals in the following description, the same reference numerals shown in different drawings will be regarded as the same or similar elements. These embodiments are only a part of the disclosure and do not disclose all possible implementations of the disclosure. Rather, these embodiments are only examples within the claim scope of the disclosure.

FIG. 1 is a circuit block diagram of a CLC display according to an embodiment of the disclosure. Referring to FIG. 1, a CLC display 100 may utilize the bistable characteristics of CLC molecules to perform display. The CLC display 100 includes a controller 110 and a CLC panel 120. The CLC panel 120 includes a plurality of pixel units 1211-12MN, where M and N are positive integers not equal to 0, respectively. Each pixel unit 1211-12MN includes CLC molecules. The plurality of pixel units 1211-12MN may be arranged in a matrix to form a pixel matrix 121. That is, the pixel matrix 121 includes the plurality of pixel units 1211-12MN arranged in a plurality of columns C1-CM and a plurality of rows R1-RN.

The controller 110 is coupled to the plurality of pixel units 1211-12MN. The controller 110 is configured to drive these pixel units 1211-12MN to display frames. The controller 110 may, for example, include a timing controller, a signal converter, a field programmable gate array (FPGA), a central processing unit (CPU) or other programmable general-purpose or special-purpose microprocessors, a digital signal processor (DSP), a programmable controller, an application specific integrated circuit (ASIC), a programmable logic device (PLD), or other similar elements, or a combination thereof, which may load and execute computer program-related firmware or software to implement control and various computing functions.

Figure 2:
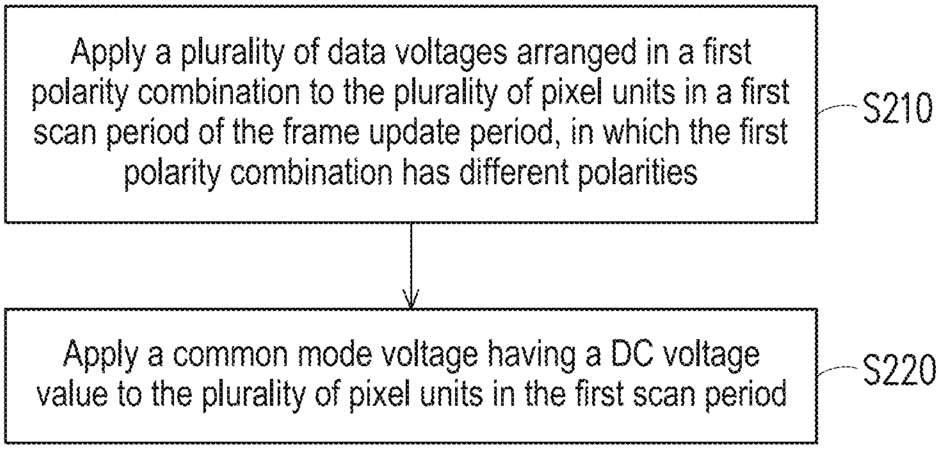
FIG. 2 is a flowchart of a driving method of a CLC display according to an embodiment of the disclosure.

FIG. 2 is a flowchart of a driving method of a CLC display according to an embodiment of the disclosure. Referring to FIG. 1 and FIG. 2, the CLC display 100 executes steps S210-S220 to implement the driving method. These steps S210-S220 may, for example, be applied in a same frame update period. The frame update period may, for example, be a period for updating a single display frame.

In step S210, during a first scan period of the frame update period, the controller 110 applies a plurality of data voltages Vdata arranged in a first polarity combination to the plurality of pixel units 1211-12MN. The first scan period may, for example, be a period for scanning the CLC panel 120, so that the arrangement states of the plurality of pixel units 1211-12MN are switched to target arrangement states (including planar state arrangement and/or focal-conic state arrangement) based on the plurality of data voltages Vdata. The plurality of data voltages Vdata may, for example, be a plurality of pulse voltages and indicate grayscales of the plurality of pixel units 1211-12MN.

During the first scan period, the controller 110 also applies a plurality of gate voltages (not shown) to the plurality of pixel units 1211-12MN. The plurality of gate voltages may, for example, be other pulse voltages and are configured to select the plurality of pixel units 1211-12MN into which the plurality of data voltages Vdata are written.

In step S220, during the first scan period, the controller 110 applies a common mode voltage Vcom having a DC voltage value to the plurality of pixel units 1211-12MN. The common mode voltage Vcom is a DC voltage. Thus, based on the plurality of gate voltages, the plurality of pixel units 1211-12MN present corresponding arrangement states according to the plurality of data voltages Vdata and the common mode voltage Vcom, and display corresponding colors accordingly.

It should be noted that the first polarity combination has different polarities. That is, during the first scan period, part of the pixel units 1211-12MN receive data voltages Vdata having a first polarity (for example, positive voltage) and the DC common mode voltage Vcom. Another part of the pixel units 1211-12MN receive data voltages Vdata having a second polarity (for example, negative voltage) and the DC common mode voltage Vcom.

It is worth mentioning that the plurality of pixel units 1211-12MN have a common first end receiving the same common mode voltage Vcom, and have different second ends receiving a plurality of positive voltages and a plurality of negative voltages (i.e., the plurality of data voltages Vdata). Therefore, the first end is not easily affected by the voltage drop between itself and the corresponding second end. Thus, the CLC display 100 may reduce the influence of charge coupling on the first end of the plurality of pixel units 1211-12MN for receiving the common mode voltage Vcom, thereby reducing H cross-talk.

Figure 3:
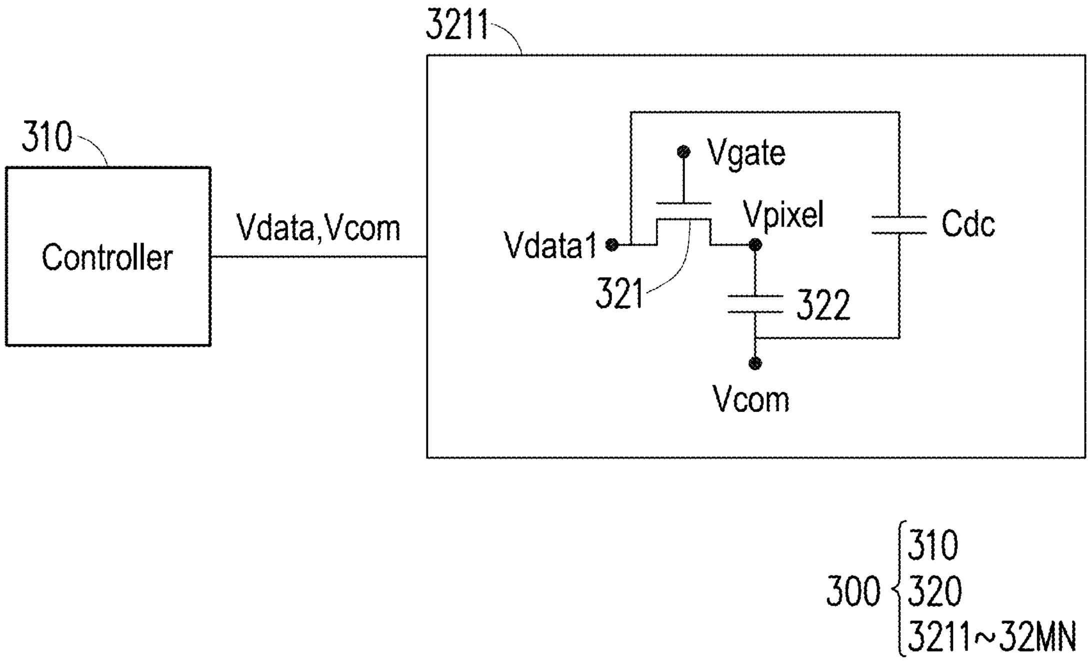
FIG. 3 is a circuit block diagram of a CLC display according to another embodiment of the disclosure.

FIG. 3 is a circuit block diagram of a CLC display according to another embodiment of the disclosure. Referring to FIG. 3, a CLC display 300 includes a controller 310 and a CLC panel 320. The CLC panel 320 includes a plurality of pixel units 3211-32MN. The controller 310, the CLC panel 320, and the pixel units 3211-32MN may be deduced by referring to the related description of the CLC display 100.

In the embodiment of FIG. 3, the equivalent circuit of each pixel unit 3211-32MN may be illustrated with pixel unit 3211 as an example. The pixel unit 3211 includes a switch element 321 and a CLC pixel 322. The switch element 321 may, for example, be implemented by an n-type metal-oxide-semiconductor field-effect transistor (NMOSFET). The CLC pixel 322 includes CLC molecules and may be represented by an equivalent capacitor.

A control end (i.e., gate) of the switch element 321 is coupled to the controller 310 to receive a gate voltage Vgate. A first end (i.e., first source/drain) of the switch element 321 is coupled to the controller 310 to receive a corresponding one of the plurality of data voltages Vdata (i.e., data voltage Vdata1). A second end (i.e., second source/drain) of the switch element 321 is coupled to a first end of the CLC pixel 322. A second end of the CLC pixel 322 is coupled to the controller 310 to receive the common mode voltage Vcom.

When the switch element 321 is turned on based on the gate voltage Vgate, the switch element 321 provides a corresponding pixel voltage Vpixel to the first end of the CLC pixel 322 according to the data voltage Vdata1. The second end of the CLC pixel 322 receives the common mode voltage Vcom. Thus, according to the voltage difference across the two ends of the CLC pixel 322, the CLC molecules perform switching. Furthermore, based on the voltage difference, a parasitic capacitor Cdc may be formed between the end of the pixel unit 3211 receiving the data voltage Vdata1 and the end receiving the common mode voltage Vcom. Through the driving method of the embodiment of the disclosure, the CLC display 300 may reduce the parasitic capacitor Cdc.

Figure 4:
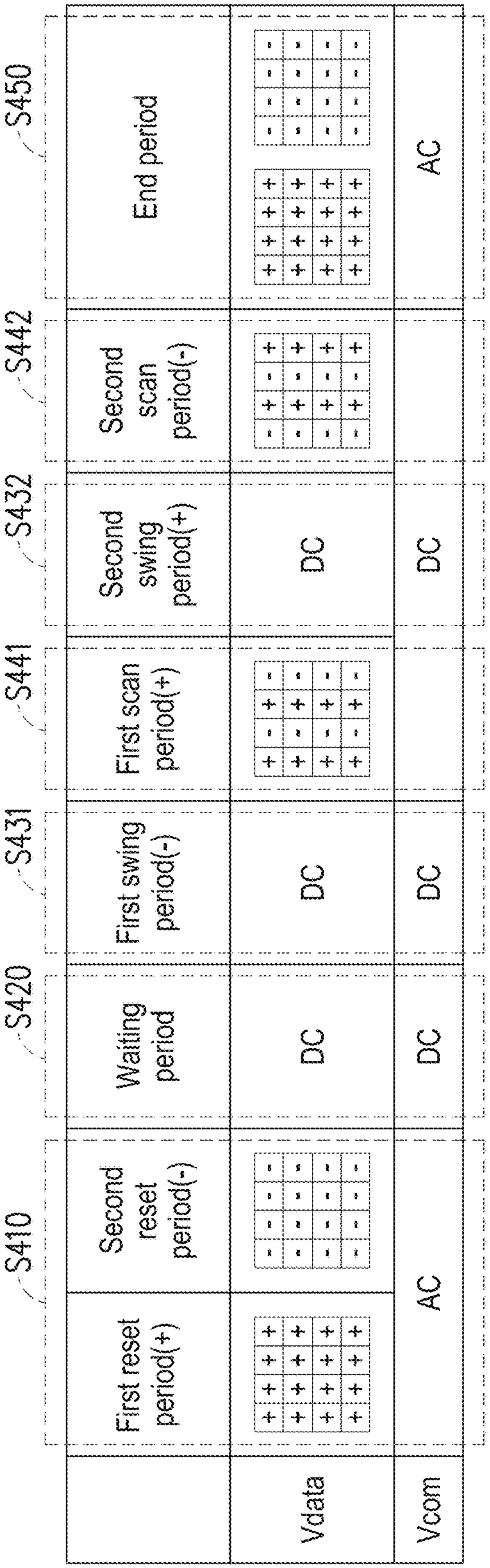
FIG. 4 is a schematic operation diagram of the CLC display according to the embodiment of FIG. 3 of the disclosure.

Referring also to FIG. 4, FIG. 4 is a schematic operation diagram of the CLC display according to the embodiment of FIG. 3 of the disclosure. In FIG. 4, the CLC display 300 illustrates the operations of various periods S410-S450 in one frame update period in a tabular manner. To avoid the CLC molecules from becoming rigid, during different periods S410-S450, the CLC display 300 may drive the plurality of pixel units 1211-12MN with a plurality of data voltages Vdata of opposite polarities, so that the plurality of pixel units 1211-12MN perform switching during corresponding periods.

Specifically, the frame update period sequentially includes a plurality of reset periods S410, a waiting period S420, a first swing period S431, a first scan period S441, a second swing period S432, a second scan period S442, and an end period S450. During these periods S410-S450, the controller 310 may apply a plurality of gate voltages (including gate voltage Vgate) to the plurality of pixel units 3211-32MN to selectively turn on or turn off the plurality of pixel units 3211-32MN. Thus, these pixel units 3211-32MN may operate according to the data voltage Vdata and the common mode voltage Vcom as shown in FIG. 4.

During the first reset period of the reset period S410, the controller 310 applies a plurality of data voltages Vdata having a first polarity (for example, positive voltage) to the plurality of first ends of the plurality of pixel units 3211-32MN. The controller 310 also applies an alternating current common mode voltage Vcom to the plurality of second ends of the plurality of pixel units 3211-32MN. Thus, based on a large voltage difference (for example, 40V), the plurality of pixel units 3211-32MN are reset to a homeotropic state.

Similarly, during the second reset period of the reset period S410, the controller 310 applies a plurality of data voltages Vdata having a second polarity (for example, negative voltage) to the plurality of first ends of the plurality of pixel units 3211-32MN. The controller 310 also applies an alternating current common mode voltage Vcom to the plurality of second ends of the plurality of pixel units 3211-32MN. Thus, the pixel units 3211-32MN perform switching and present a homeotropic state.

During the waiting period S420, the controller 310 applies a plurality of data voltages Vdata and a common mode voltage Vcom having the same DC voltage value (for example, 0V) to the plurality of pixel units 3211-32MN. Thus, the plurality of pixel units 3211-32MN wait for the CLC molecules to complete switching during this period S420.

During the first swing period S431, the controller 310 applies a plurality of data voltages Vdata having the DC voltage value (for example, 0V) to the plurality of first ends of the plurality of pixel units 3211-32MN. The controller 310 also applies a common mode voltage Vcom having the same DC voltage value to the plurality of second ends of the plurality of pixel units 3211-32MN.

During the first scan period S441, the controller 310 applies a plurality of data voltages Vdata arranged in a first polarity combination to the plurality of first ends of the plurality of pixel units 3211-32MN. The controller 310 also applies a common mode voltage Vcom having the DC voltage value (for example, 0V) to the plurality of second ends of the plurality of pixel units 3211-32MN. Based on the plurality of voltage differences, the plurality of pixel units 3211-32MN are switched to planar state arrangement and/or focal-conic state arrangement. As shown in FIG. 4, the first polarity combination may for example be a frame inversion formed by positive polarity and negative polarity alternately arranged in column units.

During the second swing period S432, the controller 310 applies a plurality of data voltages Vdata having the DC voltage value (for example, 0V) to the plurality of first ends of the plurality of pixel units 3211-32MN. The controller 310 also applies a common mode voltage Vcom having the same DC voltage value to the plurality of second ends of the plurality of pixel units 3211-32MN.

During the second scan period S442, the controller 310 applies a plurality of data voltages Vdata arranged in a second polarity combination to the plurality of first ends of the plurality of pixel units 3211-32MN. The controller 310 also applies a common mode voltage Vcom having the DC voltage value (for example, 0V) to the plurality of second ends of the plurality of pixel units 3211-32MN. Similar to the first scan period S441, based on the plurality of voltage differences, the plurality of pixel units 3211-32MN perform switching and present planar state arrangement and/or focal-conic state arrangement. The second polarity combination has different polarities, and is reverse of the first polarity combination. As shown in FIG. 4, the arrangement of the second polarity combination may, for example, be a frame inversion formed by positive polarity and negative polarity alternately arranged in column units, and is reverse of the first polarity combination.

It should be noted that the controller 310 provides a plurality of data voltages Vdata having different polarities (i.e., the first polarity combination) in a single scan period S441, and provides a plurality of data voltages Vdata having polarities reverse of the different polarities (i.e., the second polarity combination) in another scan period S442. That is, in the same frame update period, the controller 310 continues to execute the second swing period S432 after executing the first scan period S441. Then, the controller 310 continues to execute the second scan period S442. During each scan period S441 and S442, the plurality of data voltages Vdata simultaneously include positive voltage and negative voltage.

In other embodiments, in the same frame update period, the first swing period S431 and the second swing period S432 may be omitted. That is, the controller 310 continues to execute the second scan period S442 after executing the first scan period S441.

During the end period S450, the controller 310 applies a plurality of data voltages Vdata having a first polarity (for example, positive voltage) to the plurality of first ends of the plurality of pixel units 3211-32MN, and applies an alternating current common mode voltage Vcom to the plurality of second ends of the plurality of pixel units 3211-32MN. Then, the controller 310 applies a plurality of data voltages Vdata having a second polarity (for example, negative voltage) to the plurality of first ends of the plurality of pixel units 3211-32MN, and applies an alternating current common mode voltage Vcom to the plurality of second ends of the plurality of pixel units 3211-32MN. Thus, similar to the plurality of reset periods S410, based on large voltage differences, the plurality of pixel units 3211-32MN are switched to vertical states.

Figure 5:
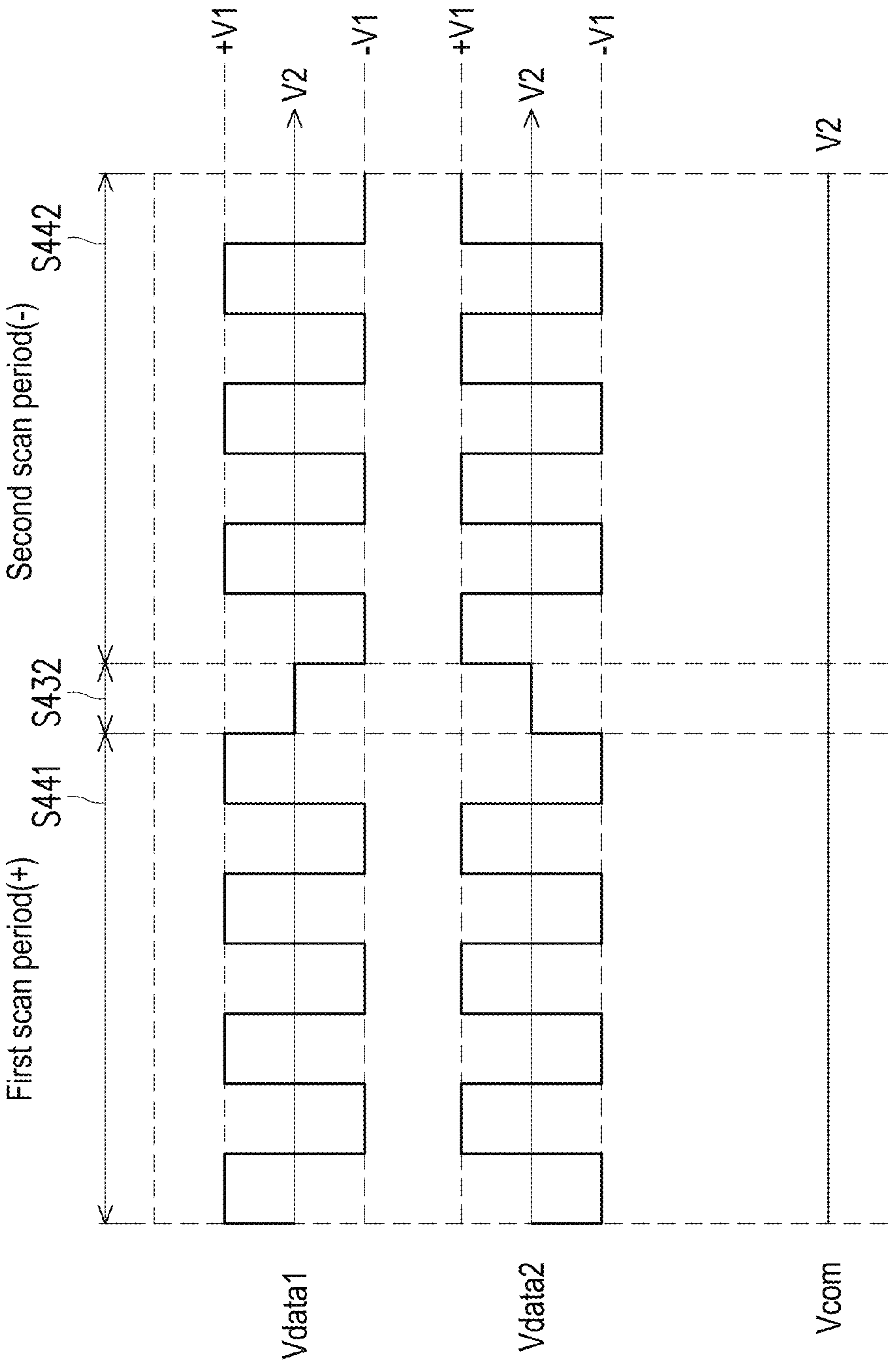
FIG. 5 is a timing diagram of the CLC display according to the embodiment of FIG. 3 of the disclosure.

FIG. 5 is a timing diagram of the CLC display according to the embodiment of FIG. 3 of the disclosure. Referring to FIG. 3 and FIG. 5, the CLC display 300 may for example apply a plurality of data voltages Vdata1-Vdata2 and the common mode voltage Vcom to a plurality of pixel units 3211-3212 located on different rows, in order to illustrate the operation details of the CLC display 300 in the first scan period S441, the second swing period S432, and the second scan period S442.

During the first scan period S441, the data voltage Vdata1 is a pulse voltage switching between a positive first voltage value V1 and a negative first voltage value V1. The data voltage Vdata1 may, for example, be applied to a plurality of pixel units located on odd rows (including pixel unit 1311). The data voltage Vdata2 is a pulse voltage switching between a positive first voltage value V1 and a negative first voltage value V1, and may be reverse of the data voltage Vdata1. The data voltage Vdata2 may, for example, be applied to a plurality of pixel units located on even rows (including pixel unit 1312). Thus, the plurality of data voltages Vdata1-Vdata2 have the first polarity combination as shown in FIG. 4 in the first scan period S441. In addition, the common mode voltage Vcom is a DC voltage having a second voltage value V2. The second voltage value V2 is smaller than the first voltage value V1, and may, for example, be 0V.

During the second swing period S432, the plurality of data voltages Vdata1-Vdata2 and the common mode voltage Vcom are all DC voltages having the second voltage value V2.

During the second scan period S442, the data voltage Vdata1 is reverse of the data voltage Vdata1 in the first scan period S441. The data voltage Vdata2 is reverse of the data voltage Vdata2 in the first scan period S441. Thus, the plurality of data voltages Vdata1-Vdata2 have the second polarity combination as shown in FIG. 4 in the second scan period S442. The common mode voltage Vcom maintains as a DC voltage having the second voltage value V2.

FIG. 6A to FIG. 6F are schematic diagrams of frame polarity inversion of the CLC display according to the embodiment of FIG. 3 of the disclosure. Referring to FIG. 3 and FIG. 6A to FIG. 6F, the CLC display 300 applies a plurality of data voltages Vdata arranged in a first polarity combination to the plurality of pixel units 3211-32MN in the first scan period S441. The CLC display 300 also applies a plurality of data voltages Vdata arranged in the second polarity combination to the plurality of pixel units 3211-32MN in the second scan period S442.

Figure 6A:
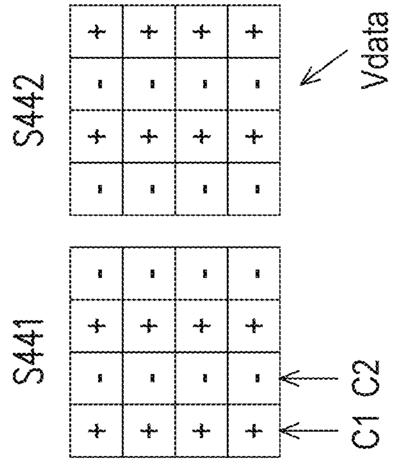
FIG. 6A to FIG. 6F are schematic diagrams of frame polarity inversion of the CLC display according to the embodiment of FIG. 3 of the disclosure.

As shown in FIG. 6A, the first polarity combination and the reverse second polarity combination may, for example, be V type frame inversion, that is, column inversion. In detail, during the first scan period S441, the first polarity combination includes a plurality of odd columns having a first polarity (for example, positive) and a plurality of even columns having a second polarity (for example, negative). The plurality of odd columns include a column C1. The plurality of even columns include a column C2. The column C1 is adjacent to column C2. During the second scan period S442, the second polarity combination is reverse of the first polarity combination.

Figure 6B:
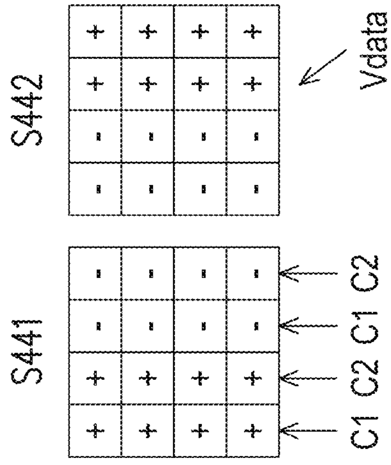

As shown in FIG. 6B, similar to V type frame inversion, the first polarity combination includes a plurality of first columns having a first polarity (for example, positive) and a plurality of second columns having a second polarity (for example, negative). The plurality of first columns are adjacent to each other, and have m (for example, 2) columns adjacent to each other as a column unit of the first polarity, such as columns C1-C2, where m is a positive integer greater than 1. The plurality of second columns are also adjacent to each other, and have m columns adjacent to each other as a column unit of the second polarity, such as columns C3-C4. The first columns C1-C2 are also adjacent to the second columns C3-C4. The second polarity combination is reverse of the first polarity combination.

Figure 6C:
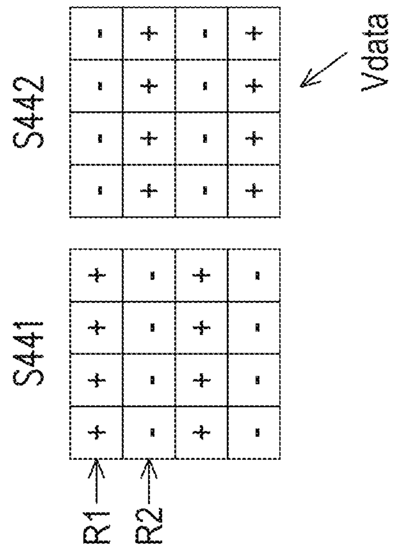

As shown in FIG. 6C, the first polarity combination and the reverse second polarity combination may, for example, be H type frame inversion, that is, row inversion. In detail, during the first scan period S441, the first polarity combination includes a plurality of odd rows having a first polarity (for example, positive) and a plurality of even rows having a second polarity (for example, negative). The plurality of odd rows include a row R1. The plurality of even rows include a row R2. The row R1 is adjacent to the row R2. During the second scan period S442, the second polarity combination is reverse of the first polarity combination.

Figure 6D:
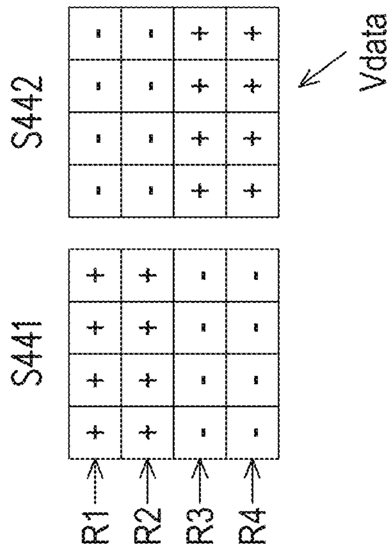

As shown in FIG. 6D, similar to H type frame inversion, the first polarity combination includes a plurality of first rows having a first polarity (for example, positive) and a plurality of second rows having a second polarity (for example, negative). The plurality of first rows are adjacent to each other, and have n (for example, 2) rows adjacent to each other as a row unit of the first polarity, such as rows R1-R2, where n is a positive integer greater than 1. The plurality of second rows are also adjacent to each other, and have n rows adjacent to each other as a row unit of the second polarity, such as rows R3-R4. The first rows R1-R2 are also adjacent to the second rows R3-R4. The second polarity combination is reverse of the first polarity combination.

Figure 6E:
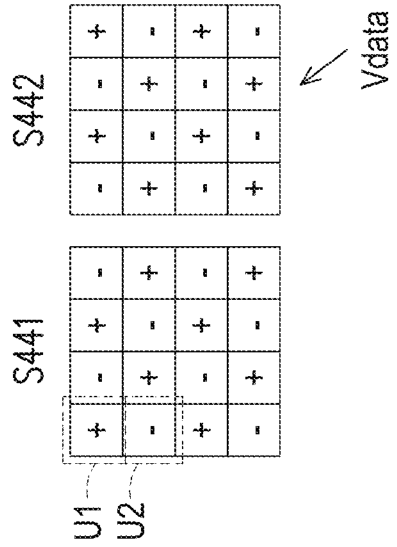

As shown in FIG. 6E, the first polarity combination and the reverse second polarity combination may, for example, be dot type frame inversion. In detail, during the first scan period S441, the first polarity combination includes a plurality of first elements having a first polarity (for example, positive) and a plurality of second elements having a second polarity (for example, negative). The plurality of first elements include an element U1, and each first element corresponds to a single pixel unit. The plurality of second elements include an element U2, and each second element corresponds to a single pixel unit. The plurality of first elements and the plurality of second elements are staggered with each other and arranged in a matrix. During the second scan period S442, the second polarity combination is reverse of the first polarity combination.

Figure 6F:
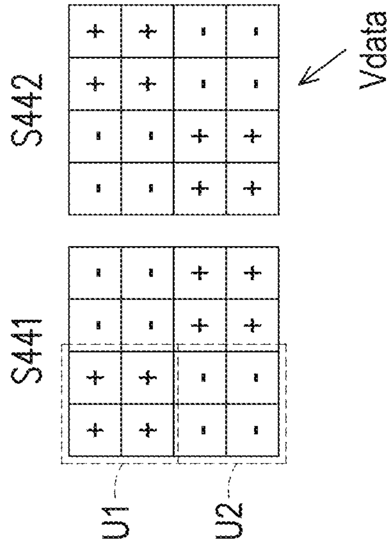

As shown in FIG. 6F, similar to dot type frame inversion, the first polarity combination includes a plurality of first elements having a first polarity (for example, positive) and a plurality of second elements having a second polarity (for example, negative). Each of the first elements includes a plurality of first sub-elements. For example, a first element U11 includes k (for example, 4) plurality of first sub-elements corresponding to a single pixel unit, where k is a positive integer greater than 1. The plurality of first sub-elements are adjacent to each other and have the same polarity. Each of the second elements includes a plurality of second sub-elements. For example, a second element U12 includes k (for example, 4) plurality of second sub-elements corresponding to a single pixel unit. The plurality of second sub-elements are adjacent to each other and have the same polarity. The second polarity combination is reverse of the first polarity combination.

In summary, the CLC display and the driving method thereof of an embodiment of the disclosure apply frame inversion having different polarities as a plurality of data voltages to a plurality of pixel units in a single scan period. Along with a DC common mode voltage, this ensures that one end of the plurality of pixel units receiving the common mode voltage is not easily affected by charge coupling. Thus, the CLC display may improve H cross-talk issues.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A cholesteric liquid crystal display, comprising:

a cholesteric liquid crystal panel, comprising a plurality of pixel units; and a controller, coupled to the pixel units, wherein during a frame update period, the controller is configured to:

apply a plurality of data voltages arranged in a first polarity combination to the pixel units in a first scan period, wherein the first polarity combination has different polarities;

apply a common mode voltage having a DC voltage value to the pixel units in the first scan period;

apply the data voltages arranged in a second polarity combination to the pixel units in a second scan period, wherein the second polarity combination has different polarities and is reverse of the first polarity combination; and apply the common mode voltage having the DC voltage value to the pixel units in the second scan period, wherein during the frame update period, the controller continues to execute a swing period after executing the first scan period, and then continues to execute the second scan period, wherein during the swing period, the controller applies the data voltages having the DC voltage value to the pixel units, and applies the common mode voltage having the DC voltage value to the pixel units.

2. The cholesteric liquid crystal display according to claim 1, wherein during the frame update period, the controller continues to execute the second scan period after executing the first scan period.

3. The cholesteric liquid crystal display according to claim 1, wherein the first polarity combination comprises a plurality of first columns having a first polarity and a plurality of second columns having the second polarity, and the first columns are adjacent to each other and adjacent to the second columns that are adjacent to each other.

4. The cholesteric liquid crystal display according to claim 1, wherein the first polarity combination comprises a plurality of odd columns having a first polarity and a plurality of even columns having the second polarity.

5. The cholesteric liquid crystal display according to claim 1, wherein the first polarity combination comprises a plurality of first rows having a first polarity and a plurality of second rows having the second polarity, and the first rows are adjacent to each other and adjacent to the second rows that are adjacent to each other.

6. The cholesteric liquid crystal display according to claim 1, wherein the first polarity combination comprises a plurality of odd rows having a first polarity and a plurality of even rows having the second polarity.

7. The cholesteric liquid crystal display according to claim 1, wherein the first polarity combination comprises a plurality of first elements having a first polarity and a plurality of second elements having the second polarity, and the first elements and the second elements are staggered with each other and arranged in a matrix.

8. The cholesteric liquid crystal display according to claim 7, wherein each of the first elements comprises a plurality of first sub-elements, the first sub-elements are adjacent to each other, each of the second elements comprises a plurality of second sub-elements, and the second sub-elements are adjacent to each other.

9. The cholesteric liquid crystal display according to claim 1, wherein each of the pixel units comprises:

a switch element, having a first end receiving a corresponding one of the data voltages; and a cholesteric liquid crystal pixel, having a first end coupled to a second end of the switch element, wherein a second end of the cholesteric liquid crystal pixel receives the common mode voltage.

10. A driving method of a cholesteric liquid crystal display, comprising:

during a first scan period of a frame update period, applying a plurality of data voltages arranged in a first polarity combination to a plurality of pixel units through a controller, wherein the first polarity combination has different polarities; and during the first scan period, applying a common mode voltage having a DC voltage value to the pixel units through the controller, wherein during the frame update period, the controller continues to execute a swing period after executing the first scan period, and then continues to execute a second scan period, and the driving method further comprises:

during the swing period, applying the data voltages having the DC voltage value to the pixel units through the controller; and during the swing period, applying the common mode voltage having the DC voltage value to the pixel units through the controller.

11. The driving method according to claim 10, further comprising:

during the second scan period of the frame update period, applying the data voltages arranged in a second polarity combination to the pixel units through the controller, wherein the second polarity combination has different polarities and is reverse of the first polarity combination; and during the second scan period, applying the common mode voltage having the DC voltage value to the pixel units through the controller.

12. The driving method according to claim 11, wherein during the frame update period, the controller continues to execute the second scan period after executing the first scan period.

* * * * *